United States Patent [19]
Oberhans

[11] Patent Number: 4,559,707
[45] Date of Patent: Dec. 24, 1985

[54] ERROR CORRECTION SYSTEM FOR LENGTH MEASURING DEVICE

[75] Inventor: Johann Oberhans, Emertsham, Fed. Rep. of Germany

[73] Assignee: Dr. Johannes Heidenhain GmbH, Traunreut, Fed. Rep. of Germany

[21] Appl. No.: 613,506

[22] Filed: May 23, 1984

[30] Foreign Application Priority Data

May 30, 1983 [DE] Fed. Rep. of Germany ....... 3319600

[51] Int. Cl.$^4$ ............................................. G01B 11/04
[52] U.S. Cl. ................................ 33/125 C; 33/125 T; 33/125 R
[58] Field of Search ............. 33/125 T, 125 R, 125 C, 33/125 A

[56] References Cited

U.S. PATENT DOCUMENTS

| | | | |
|---|---|---|---|
| 4,060,903 | 12/1977 | Ernst | 33/125 C |
| 4,160,328 | 7/1979 | Ernst | 33/125 R |
| 4,170,826 | 10/1979 | Holstein | 33/125 C |
| 4,320,578 | 3/1982 | Ernst | 33/125 T |
| 4,479,304 | 10/1984 | Nelle | 33/125 R |

FOREIGN PATENT DOCUMENTS 2518745 6/1979 Fed. Rep. of Germany .
2712421 6/1982 Fed. Rep. of Germany .

*Primary Examiner*—Willis Little
*Attorney, Agent, or Firm*—Willian, Brinks, Olds, Hofer, Gilson & Lione Ltd.

[57] ABSTRACT

A length measuring device is disclosed in which a bending rigid scale carrier is fastened to a slide piece of a machine tool at both ends by means of respective clamping shoes. A flexible measuring band is mounted on the surface of the scale carrier by means of an adhesive layer so as to be slightly shiftable in the measuring direction. The measuring band defines a graduation scanned by a scanning unit connected to the bed of the machine tool. The two ends of the measuring band are fastened by means of welding points to the ends of the scale carrier. In order to provide error correction, the end zone of the scale carrier is constructed as a stretching element formed via a joint as an integral part of the scale carrier. An adjusting screw engages directly on the scale carrier in order to adjust the longitudinal position of the stretching element in order to alter the effective length of the scale carrier and thereby adjust stretching forces applied to the measuring band to provide the desired error correction.

11 Claims, 4 Drawing Figures

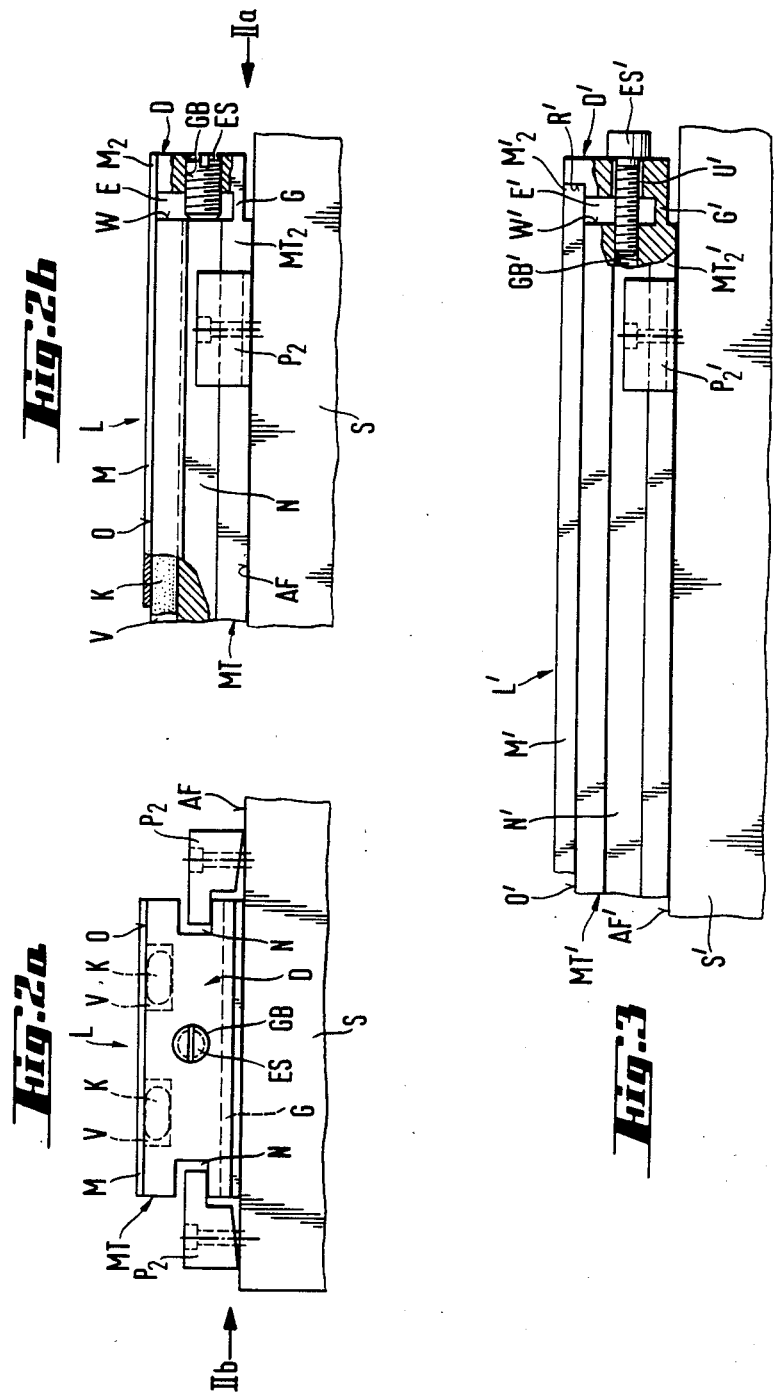

ERROR CORRECTION SYSTEM FOR LENGTH MEASURING DEVICE

BACKGROUND OF THE INVENTION

The present invention relates to an error correction system for use with a length measuring device of the type comprising a scale carrier mounted to a first object, a scale fastened rigidly at first and second longitudinally spaced points to the scale carrier and longitudinally shiftable with respect to the scale carrier therebetween, and a scanning unit secured to a second object movable relative to the first object so as to scan the scale to measure the relative positions of the first and second objects.

In length measuring devices of the type described above, one well-known approach is to fasten a measuring band to a rigid measuring band carrier by means of an elastic adhesive layer, and then to fasten the two ends of the measuring band to the measuring band carrier rigidly by means of spot welds. See for example the discussion in the brochure distributed by Dr. Johannes Heidenhain GmbH entitled "Messtechnische Information", 8th Edition, March 1980. When this approach is used subsequent correction of the length of the measuring band, for example in order to correct for machine guidance errors, is no longer directly possible after the measuring band has been welded to the measuring band carrier.

German Patent DE-PS No. 25 18 745 describes a length measuring device having a rigid scale which is fastened at one end rigidly to a rigid scale carrier. The other end of the scale is fastened by means of an upsetting or stretching device to the scale carrier. This arrangement makes possible subsequent adjustments in the length of the scale in order to correct for measuring errors after the scale has been mounted to the scale carrier. However, this approach provides a disadvantage in that the disclosed structure increases the spatial dimensions of the measuring device.

German Patent DE-PS No. 27 12 421 discloses a length measuring device having a measuring band which is fastened at one end rigidly to the object to be measured. The other end of this measuring band, in contrast to the previously described system, is acted upon directly by a correction arrangement which operates to stretch the band and is fastened to the object to be measured. This approach in a similar manner to that described above makes possible a subsequent length change of the measuring band for purposes of error correction. However, this approach also presents the disadvantage of a relatively expensive construction which enlarges the spatial dimensions of the measuring device and requires a relatively large number of components and therefore relatively high assembly costs.

SUMMARY OF THE INVENTION

The present invention is directed to a length measuring device of the type having a scale fastened rigidly to the scale carrier, at least at two points, in which graduation errors and/or machine errors can be corrected in a manner which leaves the structural form and dimensions of the measuring device substantially unaltered.

According to this invention, a length measuring device of the type described initially above is provided with first means defined by the scale carrier for accommodating changes in length of the scale carrier between the first and second longitudinally spaced points of the scale. In addition, second means are provided for engaging the scale carrier directly to adjustably position the first means so as to adjust the effective length of the scale carrier between the first and second longitudinally spaced points of the scale, and thereby to vary longitudinal forces applied to the scale so as to correct measuring errors.

The present invention provides important advantages in that the length measuring device described below is remarkably simple in construction and includes remarkably few component parts. For this reason, the preferred embodiments of this invention can be manufactured economically and can be installed quickly and simply to the object to be measured. In this way, graduation errors and/or machine errors can be simply corrected, after the measuring device has been mounted on the object to be measured. Since the spatial dimensions of the measuring device are unaltered, the present invention provides a measuring system which can be flexibly used, particularly in applications in which only limited space is available for the attachment of a measuring device. Further advantageous features are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 2a is an end view taken from the right hand side of FIG. 1.

FIG. 2b is a side view in partial cutaway of the right hand portion of the embodiment of FIG. 1.

FIG. 3 is a view corresponding to FIG. 2b of a second preferred embodiment of this invention.

DETAILED DESCRIPTION OF THE PRESENTLY PREFERRED EMBODIMENTS

Figure 1:
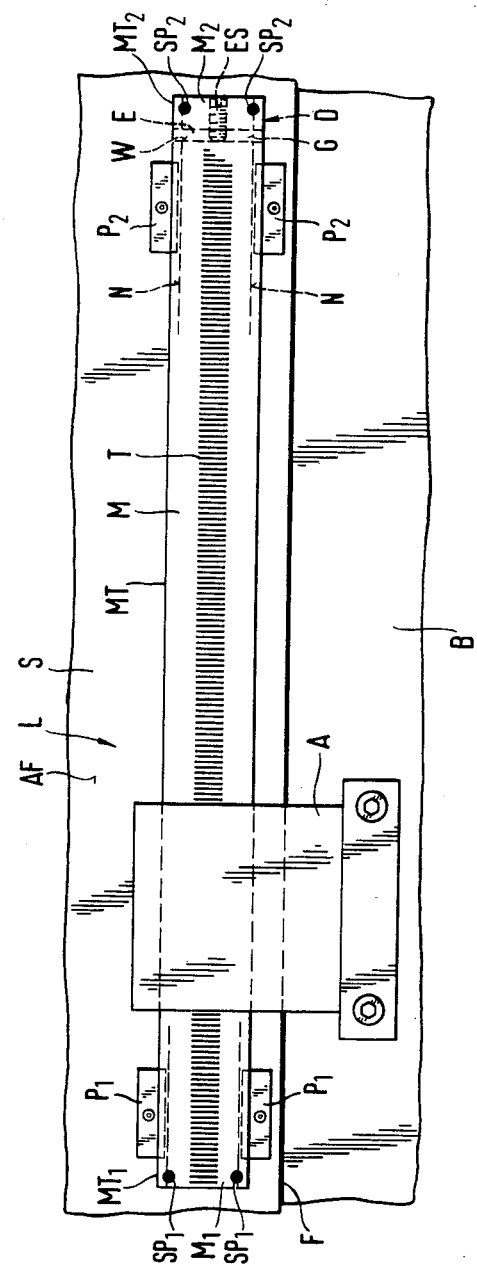
FIG. 1 is a plan view of a length measuring device which incorporates a first preferred embodiment in the present invention.

Turning now to the drawings, FIGS. 1, 2a, 2b provide three views of a length measuring device L which incorporates a first preferred embodiment of this invention. As shown in FIG. 1, this length measuring device L includes a bending rigid scale carrier MT which is mounted to an attachment surface AF of a slide piece S of a machine tool (not shown). The scale carrier MT defines two ends $MT_1$, $MT_2$, both of which are mounted by two respective clamping shoes $P_1$, $P_2$ to the slide piece S. As best shown in FIG. 2a, the scale carrier MT defines two grooves N extending longitudinally along the length of the side surfaces of the scale carrier MT. The clamping shoes $P_1$, $P_2$ engage these grooves N in order to clamp the scale carrier MT securely in place. The scale carrier MT defines an upper surface O which defines two longitudinally extending depressions V. A measuring scale M in the form of a flexible measuring band which defines a graduation T is fastened to the surface O by means of two elastic adhesive layers K positioned within the depressions V. The adhesive layers K permit a slight longitudinal shifting of the measuring band M in the measuring direction with respect to the scale carrier MT. As used herein, the term measuring direction is synonymous with the longitudinal direction extending along the length of the scale M.

The scale M defines two ends $M_1, M_2$. The first end $M_1$ of the measuring band M is fastened to the end $MT_1$ of the scale carrier MT by means of two welding points $SP_1$. The other end $M_2$ of the measuring band M is fastened by means of two welding points $SP_2$ to the other end $MT_2$ of the scale carrier MT. A scanning unit A for the scanning of the graduation T is connected in an arbitrary manner with a bed B of the machine tool. The slide piece S is shiftable longitudinally in the measuring direction relative to the bed B as guided by a guide F of the bed B. In this illustrative example, the slide piece S and bed B represent the two objects, the relative position of which is to be measured.

In order to allow for correction of graduation errors and/or machine errors, a joint G which defines a pivot axis oriented perpendicularly to the measuring direction is provided between the clamping shoes $P_2$ at the end $MT_2$ of the scale carrier MT and the welding points $SP_2$ for the measuring band M. This joint G is provided in the scale carrier MT and is formed by an incision E in the scale carrier MT oriented perpendicularly to the measuring direction. This incision E runs in the scale carrier MT perpendicular to the measuring direction and parallel to the attachment surface AF of the slide piece S. The incision E results in a reduction in the cross-sectional dimensions of the scale carrier MT near the end $MT_2$ and in the simultaneous formation of a stretching element D. The end $M_2$ of the measuring band M is fastened to the stretching element D by means of the welding points $SP_2$. The joint G and the stretching element D are integral parts of the scale carrier MT, and the scale carrier MT, the joint G and the stretching element D are formed of one single integral mass of material. The longitudinal position of the stretching element D can be adjusted by means of an adjusting screw ES in order to stretch the measuring band M to the required overall length. This adjusting screw ES is arranged in a threaded bore GB which runs in the measuring direction and is defined by the stretching element D in the vicinity of the measuring band M. The adjusting screw ES abuts a wall W of the incision E lying opposite to the stretching element D. The stretching element D together with the cross piece which forms the joint G are both spaced away from the attachment surface AF of the slide piece S. When the adjusting screw ES is rotated, the stretching element D is moved longitudinally about the axis defined by the joint G in order to vary the effective length of the scale carrier MT and thereby to stretch the measuring band M to the desired length.

Prior to mounting of the length measuring device L to the machine tool, the measuring band M is shorter than the desired measuring length. The ends $M_1$, $M_2$ of the measuring band M are fastened to the end $M_1$ of the scale carrier MT and to the stretching element D by means of welding points $SP_1$, $SP_2$, respectively. Thereafter, the measuring band M is adjusted to the appropriate length by means of the adjusting screw ES. After the length measuring device L has been attached to the slide piece S of the machine tool by means of the clamping shoes $P_1$, $P_2$, further adjustment of the length of the measuring band M can be made by the adjusting screw ES if necessary to correct for machine errors such as guidance errors of the machine guide F. The adjustment of the measuring band M to the correct length as well as correction of graduation errors and/or machine errors can be carried out simultaneously, after the length measuring device L has been attached to the slide piece S of the machine tool.

FIG. 3 shows a length measuring device L' which is similar in many ways to the measuring device L of FIGS. 1, 2a and 2b. Similar elements of the device of FIG. 3 are identified by corresponding reference symbols, but including a prime symbol. The measuring device L' includes a scale carrier MT' which is mounted to an attachment surface AF' of a slide piece S' of a machine tool (not shown). One end (not shown) of the scale carrier MT' is mounted to the attachment surface AF' by means of two clamping shoes (not shown), and the other end $MT_2'$ is mounted by means of two clamping shoes $P_2'$. As described above in connection with the first preferred embodiment, the clamping shoes $P_2'$ engage two grooves N' defined in the side surfaces of the scale carrier MT'. The scale carrier MT' defines an upper surface O' on which is mounted a bending rigid scale M' which defines a graduation. For this purpose an elastic adhesive layer is provided which permits a slight longitudinal shifting of the scale M' in the measuring direction with respect to the scale carrier MT'. The left hand end of the scale M' (not shown in FIG. 3) is arbitrarily fastened to the scale carrier MT', while the other end $M_2'$ of the scale M' is positioned firmly on a stop surface R' defined at the other end $MT_2'$ of the scale carrier MT'. For the correction of graduation errors and/or machine errors, a joint G' which defines a pivot axis lying perpendicularly to the measuring direction is defined at one end $MT_2'$ of the scale carrier MT' between the clamping shoes $P_2'$ and the stop surface R' for the scale M'. This joint G' consists of a narrow cross piece which is formed by an incision E' oriented perpendicularly to the measuring direction in the scale carrier MT'. This cross piece runs in the scale carrier MT' perpendicularly to the measuring direction, parallel to the attachment surface AF' of the slide piece S'. The incision E' in the end $MT_2'$ of the scale carrier MT' reduces the cross-sectional dimension of the scale carrier MT' and simultaneously defines an upsetting or compressing element D'. This compressing element D' defines the stop surface R' which engages the end $M_2'$ of the scale M'. The compressing element D' in conjunction with the joint G' is an integral part of the scale carrier MT'. The longitudinal position of the compressing element D' is adjusted by means of an adjusting screw ES' in order to upset or compress the scale M' to obtain the desired length of the scale M'. This adjusting screw ES' passes through a bore U' in the compressing element D' running in the measuring direction and engages a threaded bore GB' defined in the wall W' of the incision E'. The compressing element D' together with the cross piece are spaced from the attachment surface AF' of the slide piece S'. Rotation of the adjusting screw ES' adjusts the longitudinal position of the compressing element D' in order to upset or compress the scale M' through an adjustment in the effective length of the scale carrier MT'.

It should be understood that the tensioning element D, D' can be positioned in any desired point along the length of the scale carrier MT, MT'. For example, multiple tensioning elements D, D' can be positioned in the middle of the scale carrier MT, MT', or at both end zones. Multiple tensioning elements D, D' can be used to correct nonlinear measuring errors. For this purpose, the tensioning elements D, D' should be arranged in the measuring direction in correspondence to the error course of the scale carrier to be corrected. In this way a wide variety of measuring errors can be corrected, including thermally caused correction errors.

Of course, it should be understood that a wide range of changes and modifications can be made to the preferred embodiments described above. For example, instead of fastening the measuring band by means of an adhesive layer to the scale carrier, the measuring band can be mounted within a groove defined by the scale carrier. It is therefore intended that the foregoing detailed description be regarded as illustrative rather than limiting, and that it be understood that it is the following claims, including all equivalents, which are intended to define the scope of this invention.

I claim:

1. In a length measuring device of the type comprising a scale carrier mounted to a first object, a scale fastened rigidly at least at first and second longitudinally spaced points to the scale carrier and slightly longitudinally shiftable with respect to the scale carrier therebetween, and a scanning unit secured to a second object movable relative to the first object so as to scan the scale to measure the relative positions of the first and second objects, the improvement comprising:

first means, defined by the scale carrier, for accommodating changes in length of the scale carrier between the first and second longitudinally spaced points of the scale such that the scale carrier itself is variable in length between the first and second points in order to vary the longitudinal forces applied by the carrier to the scale; and second means for engaging the scale carrier directly to adjustably position the first means so as to adjust the effective length of the scale carrier between the first and second longitudinally spaced points of the scale and thereby to vary longitudinal forces applied to the scale so as to correct measuring errors, said second means engaging the scale carrier exclusively.

2. The invention of claim 1, wherein the scale comprises a flexible measuring band, wherein an elastic adhesive layer is disposed between the measuring band and the scale carrier, and wherein the first and second means cooperate to vary tensioning forces applied to the measuring band between the first and second longitudinally spaced points.

3. The invention of claim 1, wherein the first means comprises third means for forming a flexible joint in the scale carrier, said joint defining a pivot axis oriented perpendicular to the longitudinal direction.

4. The invention of claim 3 wherein the third means comprises a cross-sectional reduction in the scale carrier.

5. The invention of claim 3 wherein the second means comprises a screw mounted to the scale carrier to exert longitudinal forces on the scale carrier to adjustably position the first means.

6. The invention of claim 1 wherein said first and second means are positioned at an end zone of the scale carrier.

7. In a length measuring device of the type comprising a scale carrier mounted to a first object, a scale fastened rigidly at least at first and second longitudinally spaced points to the scale carrier and slightly longitudinally shiftable with respect to the scale carrier therebetween, and a scanning unit secured to a second object movable relative to the first object so as to scan the scale to measure the relative positions of the first and second objects, the improvement comprising:

means for defining a transverse slot in the scale carrier to provide a cross-sectional narrowing of the scale carrier which operates as a hinge joint having a pivot axis oriented transverse to the longitudinal direction, said transverse slot positioned between the two longitudinally spaced points of the scale;

a screw threadedly engaged with the scale carrier to exert longitudinal forces on the scale carrier so as to control bending of the scale carrier at the transverse slot, thereby adjusting the effective length of the scale carrier between the two longitudinally spaced points of the scale and therefore longitudinal forces applied to the scale by the carrier body in order to correct the length of the scale to correct measuring errors.

8. The invention of claim 7 wherein the scale comprises a flexible measuring band and the slot and screw cooperate to adjust tensioning forces applied to the measuring band.

9. The invention of claim 8 wherein the measuring band is welded to the scale carrier at the two longitudinally spaced points.

10. The invention of claim 7 wherein the scale comprises a rigid bar and the slot and screw cooperate to adjust compressive forces applied to the scale.

11. The invention of claim 1 wherein the scale carrier including the first means is a one-piece, integral unit.

* * * * *